Patented Nov. 21, 1933

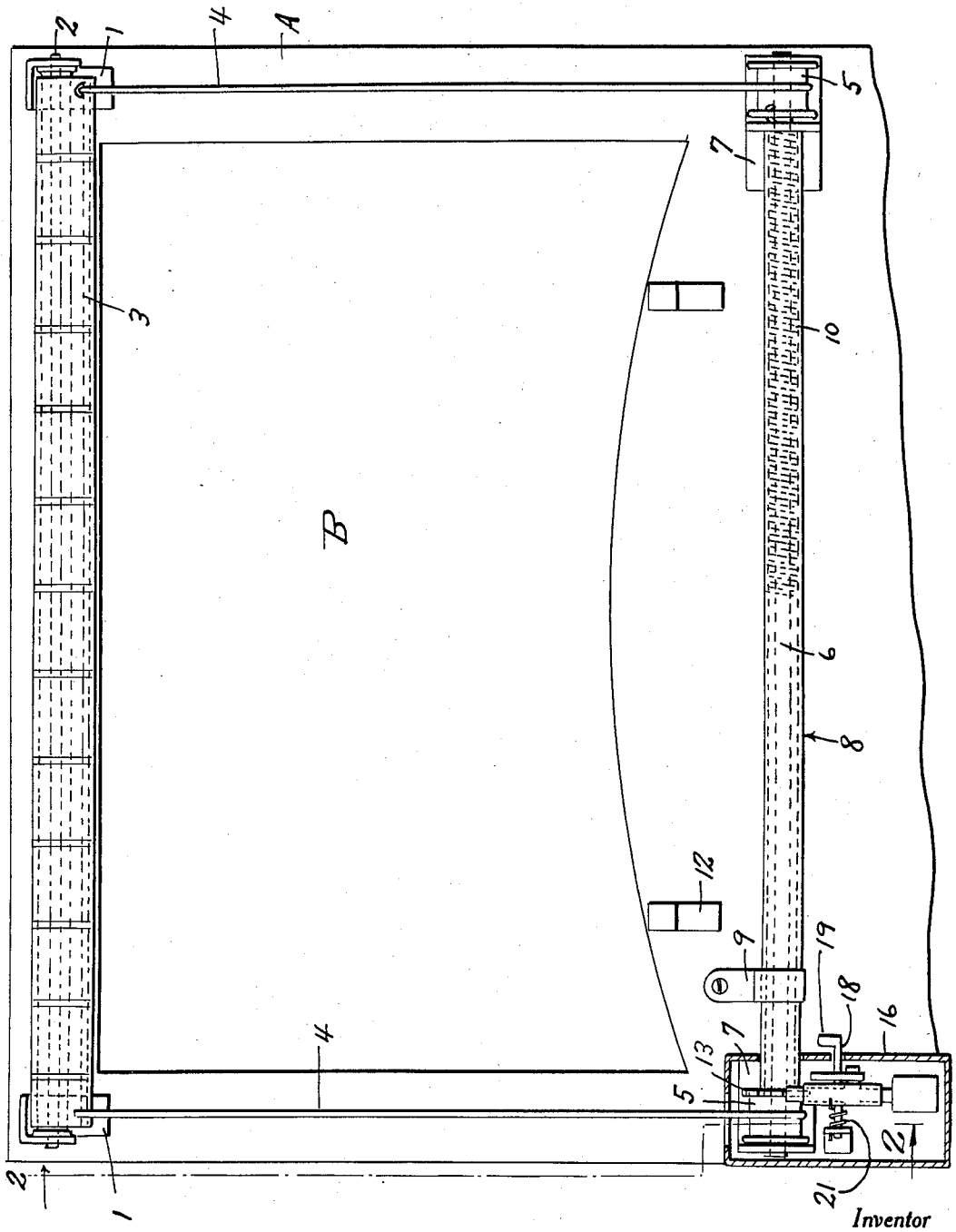

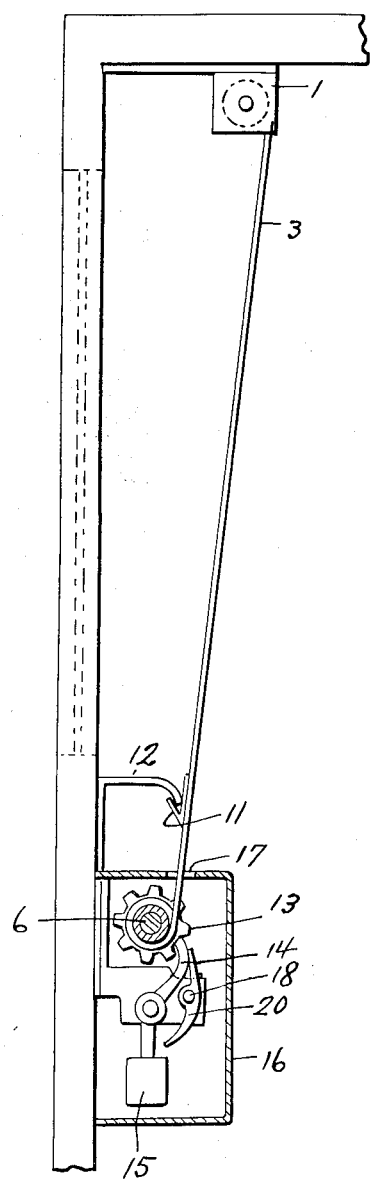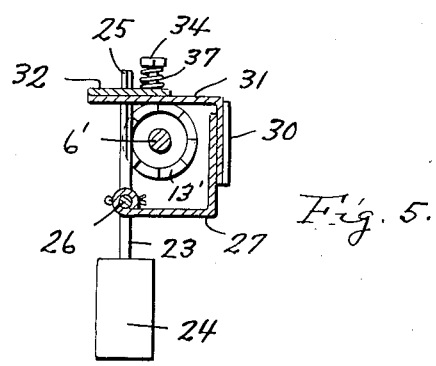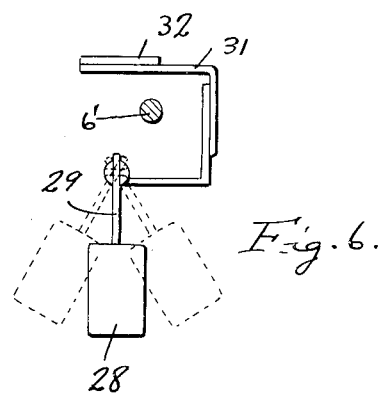

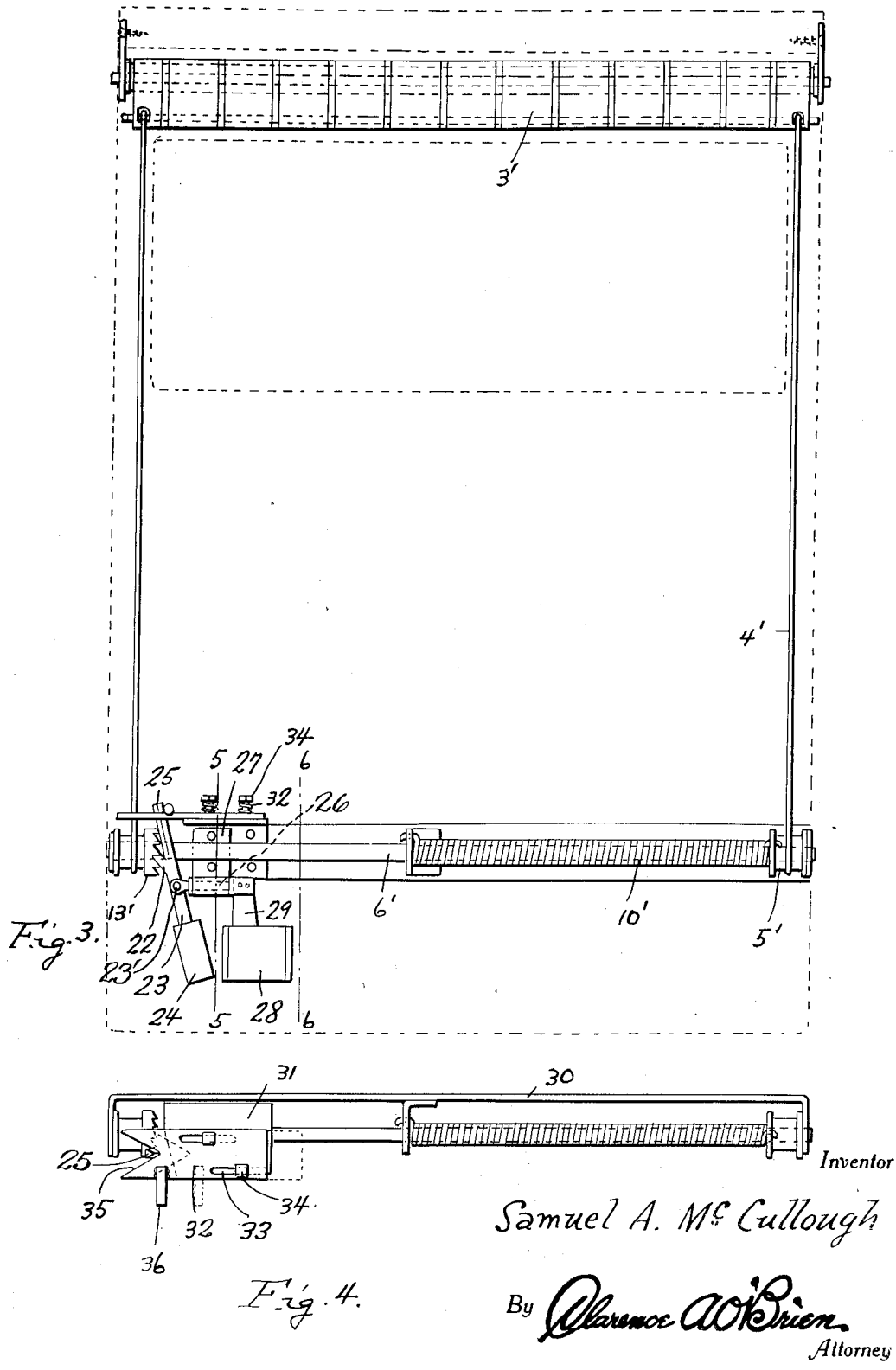

1,936,251

UNITED STATES PATENT OFFICE 1,936,251

SAFETY CURTAIN

Samuel A. McCullough, Beaver, Pa., assignor of one-fifth to Lester W. May and one-fifth to James Conroy, both of Fallston, Pa.

Application July 12, 1932. Serial No. 622,144

6 Claims. (Cl. 296—84)

This invention relates to a safety curtain for motor vehicles, the general object of the invention being to provide a curtain for the windshield and windows of an automobile with means for automatically moving the curtain over the transparent member of the windshield or window if a collision should occur between the automobile and another automobile or object or if the automobile should turn over.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary view looking towards the inner face of a windshield and its frame showing the invention in use, parts being shown in section, Fig. 2 is a section on line 2—2 of Fig. 1.

Fig. 3 is a view of the curtain means for a right hand window of an automobile.

Fig. 4 is a top plan view of the curtain operating means shown in Fig. 3.

Fig. 5 is a section on line 5—5 of Fig. 3.

Fig. 6 is a section on line 6—6 of Fig. 3.

Referring first to Figs. 1 and 2, the letter A indicates the front part of an automobile body and the letter B indicates the windshield pane thereof.

In carrying out my invention, I fasten brackets 1 to the inner face of the front part of the body and these brackets form bearings for the trunnions 2 of a roller on which is wound a curtain 3. Cords 4 are attached to the lower edge of the curtain in any suitable manner at the sides thereof and these cords pass downwardly and are fastened to the drums 5 attached to a rod 6 at the ends thereof, this rod being rotatably supported in the brackets 7 attached to the inner face of the front part of the body below the transparent member B. This rod passes through a casing 8 fastened to the body of the automobile by a bracket 9 and a spring 10 is located in the casing and has one end attached thereto and its other end attached to one of the drums 5, the spring tending to rotate the drums and the rod 6 in a direction to wind up the cords 4 so as to pull down the curtain over the transparent member of the windshield as shown in Fig. 2.

When the curtain is so pulled down, a beveled hook 11 attached to each side portion of the curtain adjacent the bottom thereof will engage a downwardly curved hook 12 located under the transparent member B, so that these two pairs of hooks will hold the curtain in lowered position as shown in Fig. 2.

One of the drums 5 is formed with a ratchet 13 which is engaged by a dog 14 having a weight 15 attached to its lower end, this dog normally holding the rod 6 and the drums 5 against actuation by the spring 10 so that the curtain will remain in rolled up position at the top of the windshield. However, if a collision occurs, the shock will throw the weight 15 forwardly so that the dog 14 is released from the ratchet which permits the spring 10 to rotate the rod and the drums so that the cords will be wound upon the drum and the curtain will be pulled downwardly until the hooks 11 engage the hooks 12 and thus the curtain will be held in stretched position in rear of the transparent portion of the windshield so that if the windshield pane should be broken the flying glass will not harm the occupants of the automobile.

A small casing 16 encloses the ratchet carrying drum and the dog and the top of the casing has an opening 17 therein for passage of the cord 4, and a small shaft 18 is journalled in the casing and has one end extending therefrom and formed with a crank handle 19. This shaft within the casing supports a double arm lever 20 the upper arm of which is normally held against the upper end of the dog by a small spring 21 on the shaft 18 and, by turning the shaft through means of the handle 19, the lower arm of the lever can be moved against the lower end of the dog so as to release the ratchet from the dog to permit the curtain to be lowered or partly lowered. In the latter position, the curtain acts as a sun shade.

Thus it will be seen that when a headon collision occurs or the car strikes an object, the resultant shock will release the dog from the ratchet and the curtain will be pulled downwardly to cover the transparent member and thus prevent the occupants of the automobile from being injured by the breaking of the transparent member.

It will also be seen that by moving the dog to releasing position by means of the shaft 18 the curtain may be partly lowered so that the same can be used as a sun shade.

Figs. 3, 4, 5 and 6 show the invention applied to one of the windows of an automobile, and in this case, the cords 4' are attached to the drums 5' carried by the rod or shaft 6' located in the lower part of the window receiving opening of the automobile, with the spring 10' adapted to rotate the shaft drums in a direction to wind the cords on the drums to pull the curtain 3' over the transparent member of the window. One of the drums carries the ratchet 13' but the teeth of the ratchet are formed on a flange which extends from one end of the drum, as shown, and said teeth are engaged by a dog 22 formed on a rod 23, the lower end of which has attached thereto a weight 24 and the upper end of the rod is beveled as shown at 25.

Intermediate the ends of the rod 23 a short shaft 26 is pivoted which is rotatably arranged in a bearing part formed in the bracket 27 located on a window receiving opening, and a weight 28 has an arm 29 thereon which is connected to the other end of the short shaft 26. The bearings for the shaft 6' and the bracket 27 are attached to an elongated bracket 30 which is suitably supported on a wall of the window receiving opening and this bracket 30 carries a bracket 31 having a horizontal part on which is slidably arranged the plate 32 having the slots 33 therein for receiving the pins 34 carried by said horizontal part and springs 32' encircling the pins or bolts 34 and act to frictionally press the plate 32 on said horizontal part of the bracket 31. This plate 32 is provided with a V-shaped recess 35 through which passes the beveled end of the rod 23.

A handle 36 is attached to the plate 32 and extends through a slot in the inner wall of the window receiving opening, so that it can be manipulated by an occupant of the automobile.

The shaft 6' and its associated parts are located in the lower part of the window receiving opening with the parts spaced sufficient from the inner and outer walls of said opening to permit swinging movement of the weight 28 and these weights 24 and 28 and their associated parts are arranged in the forward part of the window receiving opening. Normally the plate 32 occupies the dotted line position shown in Fig. 4 so that the upper end of the rod 23 will be permitted to move rearwardly when the weight 24 moves forwardly if the vehicle should strike an object in front of it. Thus if a head-on collision occurs the weight 24 will move forwardly and the upper end of the rod 23 will move rearwardly when said rod 23 rocks on the pivot 23' which connects it with the shaft 26. This movement of the rod 23 moves the dog 22 out of engagement with the ratchet teeth 13' of the forward drum 5' and thus the spring 10' will rotate the shaft 6' and the drums and thus the curtain will be lowered and prevent particles of glass injuring the occupants of the vehicle.

If the vehicle should upset on its right side the weight 28 would move toward the right and thus rotate the shaft 26 which would swing the tooth carrying part of the rod 23 outwardly from the toothed flange of the drum 5' so that the tooth 22 of the rod 23 would be released from the teeth of the ratchet and thus the shaft 6' would be rotated by the spring 10' and the curtain 3' lowered. If the vehicle should upset toward its left side the weight 28 would swing in the opposite direction and the tooth 22 of the rod 23 would swing into the circular space formed by the flange which carries the teeth 13' so that the shaft 6' would be released and the spring 10' would lower the curtain. If the vehicle was struck on either side by another vehicle, the weight 28 would be caused to swing to release the tooth 22 from the ratchet 13' and thus the curtain would be lowered.

When it is desired to return the dog 22 into engagement with the teeth of the ratchet 13' the plate 32 is moved forward by its handle 36 and the V-shaped notch 35 will position the rod 23 so that the tooth 22 will engage the teeth of the ratchet 13'. Then the plate 32 is moved rearwardly to the dotted line position shown in Fig. 4.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A safety device for preventing fragments of a broken transparent member from injuring occupants of a vehicle comprising a curtain, a roller on which the curtain is wound, a shaft, means for connecting the shaft with the curtain whereby rotary movement of the shaft will unwind the roller, a spring for rotating the shaft, ratchet means, including a dog, for holding the shaft against movement by the spring, and a weight connected with the dog for moving the dog to releasing position when a collision occurs or the vehicle is upset.

2. In a vehicle provided with a transparent member, a safety device for preventing fragments of said transparent member, if the same should break, from injuring occupants of the vehicle, said device comprising a curtain, a roller on which the curtain is wound, a shaft supported for rotary movement, a drum on the shaft, a flexible member having one end connected with the drum and its other end with the curtain, a ratchet on the drum, a spring for rotating the shaft to wind the flexible member on the drum, a dog engaging the ratchet for preventing rotation of the shaft by the spring and a weight connected with the dog.

3. A safety device for vehicles comprising a curtain, a roller upon which the curtain is wound, means for supporting the roller adjacent an edge of the transparent member of the vehicle, a shaft rotatably supported adjacent an opposite edge of the transparent member, drums on the shaft, flexible members connected with the drums and the curtain, a spring for rotating the shaft to wind the flexible members upon the drums to move the curtain over the inner face of the transparent member, ratchet teeth on one of the drums, a pivoted dog engaging the teeth, and a weight connected with the dog for moving the dog to releasing position from the shock of a collision or the vehicle upsetting.

4. A safety device for vehicles comprising a curtain, a roller upon which the curtain is wound, means for supporting the roller adjacent an edge of the transparent member of the vehicle, a shaft rotatably supported adjacent an opposite edge of the transparent member, drums on the shaft, flexible members connected with the drums and the curtain, a spring for rotating the shaft to wind the flexible members upon the drums to move the curtain over the inner face of the transparent member, ratchet teeth on one of the drums, a pivoted dog engaging the teeth, a weight connected with the dog for moving the dog to releasing position from the shock of a collision or the vehicle upsetting, and manually operated means for moving the dog to releasing position.

5. A safety device for preventing the breaking of a transparent member of a vehicle from injuring occupants of the vehicle comprising a curtain, a roller on which the curtain is wound, means for supporting the roller adjacent one edge of the transparent member, a shaft rotatably supported adjacent an opposite edge thereof, a spring for rotating the shaft, drums carried by the shaft, flexible members connecting the drums with the curtain, a ratchet connected with one drum, a dog engaging the ratchet, a weight on the dog for moving the dog to releasing position when a collision occurs, a shaft rotatably supported and to one end of which the dog is pivoted, the last-mentioned shaft paralleling the first-mentioned shaft, and a second weight connected with the second-mentioned shaft and movable in a plane at right angles to the plane of movement of the first weight.

6. A safety device for preventing the breaking of a transparent member of a vehicle from injuring occupants of a vehicle comprising a curtain, a roller on which the curtain is wound, means for supporting the roller adjacent one edge of the transparent member, a shaft rotatably supported adjacent an opposite edge thereof, a spring for rotating the shaft, drums carried by the shaft, flexible members connecting the drums with the curtain, a ratchet connected with one drum, a dog engaging the ratchet, a weight on the dog for moving the dog to releasing position when a collision occurs, a shaft rotatably supported and to one end of which the dog is pivoted, the last-mentioned shaft paralleling the first-mentioned shaft, a second weight connected with the second-mentioned shaft and movable in a plane at right angles to the plane of movement of the first weight, and manually operated means for moving the dog back into engagement with the ratchet after the dog has been released from the ratchet.

SAMUEL A. McCULLOUGH.